United States Patent
Jandhyala et al.

(10) Patent No.: US 7,499,939 B2
(45) Date of Patent: Mar. 3, 2009

(54) METHOD FOR EFFICIENTLY MANAGING MEMBERSHIP IN A HIERARCHICAL DATA STRUCTURE

(75) Inventors: Srinivas Jandhyala, Austin, TX (US); Thiha Than, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 10/967,545

(22) Filed: Oct. 18, 2004

(65) Prior Publication Data
US 2006/0085440 A1  Apr. 20, 2006

(51) Int. Cl.
*G06F 17/30* (2006.01)
(52) U.S. Cl. .......................... 707/102; 707/1
(58) Field of Classification Search ............ 707/1, 707/102
See application file for complete search history.

(56) References Cited

U.S. PATENT DOCUMENTS

| | | | | |
|---|---|---|---|---|
| 4,633,394 A | | 12/1986 | Georgiou et al. ............ 364/200 |
| 4,864,497 A | * | 9/1989 | Lowry et al. ................. 707/102 |
| 5,664,177 A | * | 9/1997 | Lowry ......................... 707/100 |
| 5,974,407 A | * | 10/1999 | Sacks ............................ 707/2 |
| 5,991,793 A | | 11/1999 | Mukaida et al. ............. 709/104 |
| 6,175,836 B1 | * | 1/2001 | Aldred .................... 707/103 R |
| 6,236,988 B1 | * | 5/2001 | Aldred ........................... 707/3 |
| 6,314,526 B1 | | 11/2001 | Arendt et al. .................. 714/4 |
| 6,408,336 B1 | | 6/2002 | Schneider et al. ............ 709/229 |
| 6,480,857 B1 | * | 11/2002 | Chandler ..................... 707/100 |
| 6,587,860 B1 | | 7/2003 | Chandra et al. ............. 707/202 |
| 6,591,300 B1 | | 7/2003 | Yurkovic ..................... 709/226 |
| 6,654,745 B2 | | 11/2003 | Feldman ......................... 707/9 |
| 6,684,222 B1 | * | 1/2004 | Cornelius et al. ......... 707/104.1 |
| 2001/0013030 A1 | * | 8/2001 | Colby et al. ................... 707/1 |
| 2002/0010710 A1 | | 1/2002 | Binnig ......................... 707/500 |
| 2003/0110150 A1 | * | 6/2003 | O'Neil et al. .................. 707/1 |
| 2003/0204480 A1 | * | 10/2003 | Heinrichs et al. .............. 707/1 |
| 2004/0083222 A1 | * | 4/2004 | Pecherer .................... 707/100 |
| 2004/0148568 A1 | * | 7/2004 | Springer .................... 715/513 |

OTHER PUBLICATIONS

Bilau, N, and Schnusenberg, J. A VLSI-Processor for the Generation of the Hierarchical Structure Code in Real Time. 1993, IEEE.*
Yu, Lin and Rosenkrantz, Daniel. Representability of Design Objects by Ancestor-Controlled Hierarchical Specifications, 1990, ACM.*

(Continued)

*Primary Examiner*—Mohammad Ali
*Assistant Examiner*—Alexandria Y Bromell
(74) *Attorney, Agent, or Firm*—Kunzler & McKenzie

(57) ABSTRACT

A method is disclosed to efficiently manage membership within a hierarchical data structure. A record module is included to create a record that includes a member identifier, a member type, and an ancestor list for a member of a hierarchical data structure. The member type identifies the member as resource or a group comprising at least one resource, and the ancestor list comprises group identifiers ordered to represent a hierarchical relationship between the member and a top-level group. A storage module is included that stores the record in a collection. A reference module is included that references the record in response to accessing the member of the hierarchical data structure.

8 Claims, 8 Drawing Sheets

OTHER PUBLICATIONS

Page, William, and Austin, David, and Baird II, Williard. Using Oracle 8/8i (Book), 1999, Que—A Division of Macmillan Computer Publishing, especially pp. 16, 17, 22-25, 261, 304, 307, 338-339, 342, and 613-614.*

"Recursion" http://www.webopedia.com/TERM/r/recursion.html.

* cited by examiner

400 → 
402 → G1
   └ C1
   G2
   └ C2
   G3
   └ C3
   G4
   └ C4

404 →

| Row | Member Identifier 204 | Group Identifier 406 | Parent Identifier 216 | Member Type 206 | Ancestor List 208 |
|---|---|---|---|---|---|
| 1 | C1 | G1 | G1 | R, D | G1 |
| 2 | C2 | G2 | G2 | R, D | G2 |
| 3 | C3 | G3 | G3 | R, D | G3 |
| 4 | C4 | G4 | G4 | R, D | G4 |

| Row | Member Identifier 204 | Group Identifier 406 | Parent Identifier 216 | Member Type 206 | Ancestor List 208 |
|---|---|---|---|---|---|
| 1 | C1 | G1 | G1 | R, D | G1 |
| 2 | C2 | G2 | G2 | R, D | G2 |
| 3 | C3 | G3 | G3 | R, D | G3 |
| 4 | C4 | G4 | G4 | R, D | G4 |
| 5 | G4 | G3 | G3 | G, D | G3 |
| 6 | C4 | G3 | G4 | R, I | G3:G4 |
| 7 | G3 | G2 | G2 | G, D | G2 |
| 8 | C3 | G2 | G3 | R, I | G2:G3 |
| 9 | G4 | G2 | G3 | G, I | G2:G3 |
| 10 | C4 | G2 | G4 | R, I | G2:G3:G4 |
| 11 | G2 | G1 | G1 | G, D | G1 |
| 12 | C2 | G1 | G2 | R, I | G1:G2 |
| 13 | G3 | G1 | G2 | G, I | G1:G2 |
| 14 | C3 | G1 | G3 | R, I | G1:G2:G3 |
| 15 | G4 | G1 | G3 | G, I | G1:G2:G3 |
| 16 | C4 | G1 | G4 | R, I | G1:G2:G3:G4 |
| 17 | G3 | G1 | G1 | G, D | G1 |
| 18 | C3 | G1 | G3 | R, I | G1:G3 |
| 19 | G4 | G1 | G3 | G, I | G1:G3 |
| 20 | C4 | G1 | G4 | R, I | G1:G3:G4 |

| Row | Member Identifier 204 | Group Identifier 406 | Parent Identifier 216 | Member Type 206 | Ancestor List 208 |
|---|---|---|---|---|---|
| 1 | C1 | G1 | G1 | R, D | G1 |
| 2 | C2 | G2 | G2 | R, D | G2 |
| ~~3~~ | ~~C3~~ | ~~G3~~ | ~~G3~~ | ~~R, D~~ | ~~G3~~ |
| 4 | C4 | G4 | G4 | R, D | G4 |
| ~~5~~ | ~~C4~~ | ~~G3~~ | ~~G3~~ | ~~C, D~~ | ~~G3~~ |
| ~~6~~ | ~~C4~~ | ~~G3~~ | ~~G4~~ | ~~R, I~~ | ~~G3:G4~~ |
| ~~7~~ | ~~C3~~ | ~~G2~~ | ~~G2~~ | ~~C, D~~ | ~~G2~~ |
| ~~8~~ | ~~C3~~ | ~~G2~~ | ~~G3~~ | ~~R, I~~ | ~~G2:G3~~ |
| ~~9~~ | ~~C4~~ | ~~G2~~ | ~~G3~~ | ~~C, I~~ | ~~G2:G3~~ |
| ~~10~~ | ~~C4~~ | ~~G2~~ | ~~G4~~ | ~~R, I~~ | ~~G2:G3:G4~~ |
| ~~11~~ | ~~C3~~ | ~~G1~~ | ~~G1~~ | ~~C, D~~ | ~~G1~~ |
| ~~12~~ | ~~C3~~ | ~~G1~~ | ~~G3~~ | ~~R, I~~ | ~~G1:G3~~ |
| ~~13~~ | ~~C4~~ | ~~G1~~ | ~~G3~~ | ~~C, I~~ | ~~G1:G3~~ |
| ~~14~~ | ~~C4~~ | ~~G1~~ | ~~G4~~ | ~~R, I~~ | ~~G1:G3:G4~~ |

FIG. 9

METHOD FOR EFFICIENTLY MANAGING MEMBERSHIP IN A HIERARCHICAL DATA STRUCTURE

BACKGROUND OF THE INVENTION

1. Field of the Invention

This invention relates to representing a hierarchical data structure and more particularly relates to efficiently managing membership within a hierarchical data structure.

2. Description of the Related Art

Computer systems users and administrators organize resources such as table spaces, file systems, computers, and databases. Sets or collections of resources are often organized into groups. Often groups include subgroups, which may in turn include subgroups. Relationships of resources and groups organized with multiple levels of groups are often referred to as hierarchical data structures or trees. In a hierarchical relationship, groups are often referred to as nodes. A typical example of a hierarchical data structure is a file structure on a computer. Such a file structure includes files represented as stored in folders. Any folder may include other folders as well as files. A top-level folder may include many levels of subfolders and each folder may include files. All of the folders and files along with the linking relationships between them form a hierarchical data structure or tree.

Hierarchical data structures allow computer system users and administrators to track critical applications, organize data for reports, and efficiently manage resources. For example, a supply chain application may use ten table spaces in a database that are critical to the business in addition to many other resources in a hierarchical data structure. Grouping the ten table spaces allows the application user to generate reports and monitor the ten table spaces to determine whether any of them are running out of space. Hierarchical grouping of resources allows a user to monitor the vital resources more closely than other less vital resources.

Hierarchical grouping is used in storage management systems like International Business Machine's ("IBM") Tivoli Storage Resource Manger ("TSRM"). The TSRM is an intelligent console for storage management that provides a set of policy-driven, automated storage management tools that help a user understand capacity, availability, events, and assets in a storage management environment.

When forming a hierarchical data structure, a user or administrator may wish to include a resource or a group in more than one group. For example a file containing pricing and quantities of a part may be useful in a group used to monitor pricing as well as a group used to monitor quantities.

Allowing a group or resource to be part of another group makes tracking groups and member resources very complex. This is even more complicated when a resource can be included in a group by inheritance. Inheritance relationships are formed when a parent node having descendant nodes is added to another node in a hierarchy. The descendent nodes become descendents of the other node by inheritance. An inheritance relationship includes at least one intermediate parent node. For example, if file system A is part of group A and group A is added to group B, file system A becomes part of group B by inheritance. In other words, file system A is indirectly added to group B through group A. File system A may also be added to group B directly as well. If file system A is removed from group A, only the file system A reference in group A is removed and the file system A reference directly referenced in group B remains. This is a simple example. The relationships become more complex when many resources and groups are nested in the hierarchy.

Currently available systems to track membership in hierarchical data structures or trees use recursion. Recursion is a programming technique in which a routine calls itself repeatedly until a condition is met. Recursion is a powerful tool, but may strain a computer's resources. Rather than directly referencing a node's location in a hierarchical tree, current methods for accessing a node require recursion of a hierarchical tree which requires traversing the tree node by node. Recursively searching a hierarchical tree may require a large amount of computer resources.

From the foregoing discussion, it should be apparent that a need exists for an apparatus, system, and method to efficiently manage membership within a hierarchical data structure. Beneficially, such an apparatus, system, and method would efficiently use scarce computer resources by efficiently keeping track of members of a hierarchical data structure without recursion and in a non-hierarchical data structure. Use of a non-hierarchical data structure to represent a hierarchical data structure allows faster access of groups and resources and thus uses less computer resources than currently available methods of managing membership in a hierarchical data structure.

SUMMARY OF THE INVENTION

The present invention has been developed in response to the present state of the art, and in particular, in response to the problems and needs in the art that have not yet been fully solved by currently available methods to manage membership in a hierarchical data structure. Accordingly, the present invention has been developed to provide an apparatus, system, and method for efficiently managing membership in a hierarchical data structure that overcome many or all of the above-discussed shortcomings in the art.

The apparatus to efficiently manage a hierarchical data structure is provided with a logic unit containing a plurality of modules configured to functionally execute the necessary steps of efficiently managing membership in a hierarchical data structure without recursion. These modules in the described embodiments include a record module. The record module creates a record with a member identifier, a member type, and an ancestor list for a member of a hierarchical data structure. The member type identifies the member as a resource or a group including at least one resource. The ancestor list includes group identifiers ordered to represent a hierarchical relationship between the member and a top-level group. The apparatus includes a storage module that stores the record in a collection and a reference module that references the record in response to accessing the member of the hierarchical data structure.

The record, in one embodiment, comprises a non-hierarchical data structure that represents the hierarchical relationship between members of the hierarchical data structure. In another embodiment, the reference module is further configured to directly access the record in the collection.

The apparatus is further configured, in one embodiment, to include an add module that directly adds at least one record to the collection when a member is added to the hierarchical data structure. In another embodiment, the apparatus includes at least one delete module that directly deletes a record from the collection when a member is deleted from the hierarchical data structure. In yet another embodiment, the apparatus includes a wildcard module that modifies the collection in response to changes in membership in the hierarchical data structure including additions and deletions based on a common characteristic among members.

In a further embodiment, the member type further includes an identifier that indicates that a member relates directly or indirectly to a top-level group. In another embodiment, the record also includes a parent identifier that identifies a group to which a member directly belongs.

A system of the present invention is also presented to efficiently manage a hierarchical data structure. The system may be embodied by a database residing on a computer. The system includes a record module that creates a record comprising a member identifier, a member type, and an ancestor list for a member of a hierarchical data structure. The member type identifies the member as a resource or a group including at least one resource. The ancestor list comprises group identifiers ordered to represent a hierarchical relationship between the member and a top-level group. The record comprises a non-hierarchical data structure that represents the hierarchical relationship between members of the hierarchical data structure. The system includes a storage module that stores the record in a collection in the database. The system also includes a reference module that directly references the record in the collection in response to accessing the member of the hierarchical data structure. The reference module may further be configured to directly access the record in the collection.

The system, in one embodiment, includes an add module that directly adds at least one record to the collection when a member is added to the hierarchical data structure. In another embodiment, the system includes a delete module that directly deletes a record from the collection when a member is deleted from the hierarchical data structure.

A method of the present invention is also presented for efficiently managing membership within a hierarchical data structure. The method in the disclosed embodiments substantially includes the steps necessary to carry out the functions presented above with respect to the operation of the described apparatus and system. In one embodiment, the method includes creating a record comprising a member identifier, a member type, and an ancestor list for a member of a hierarchical data structure. The member type identifies the member as a resource or a group comprising at least one resource. The ancestor list includes group identifiers ordered to represent a hierarchical relationship between the member and a top-level group. The method includes storing the record in a collection and referencing the record in response to accessing the member of the hierarchical data structure.

The record may also include a non-hierarchical data structure that represents the hierarchical relationship between members of the hierarchical data structure. The method may also include directly accessing the record in the collection.

In a further embodiment, the method includes directly adding at least one record to the collection when a member is added to the hierarchical data structure. In another embodiment, the method includes directly deleting at least one record from the collection when a member is deleted from the hierarchical data structure. In yet another embodiment, the method includes modifying the collection in response to changes in membership in the hierarchical data structure. Alternatively, changes in membership in the hierarchical data structure comprise additions and deletions based on a common characteristic among members.

In one embodiment, the member type further includes an identifier that indicates that a member relates directly or indirectly to a top-level group. In another embodiment, the record further includes a parent identifier that identifies a group to which a member directly belongs.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is part one of an example of one embodiment of a method for efficiently managing membership within a hierarchical data structure in accordance with the present invention;

FIG. 5 is part two of an example of one embodiment of a method for efficiently managing membership within a hierarchical data structure in accordance with the present invention;

FIG. 9 is part six of an example of one embodiment of a method for efficiently managing membership within a hierarchical data structure in accordance with the present invention.

DETAILED DESCRIPTION OF THE INVENTION

Figure 1:
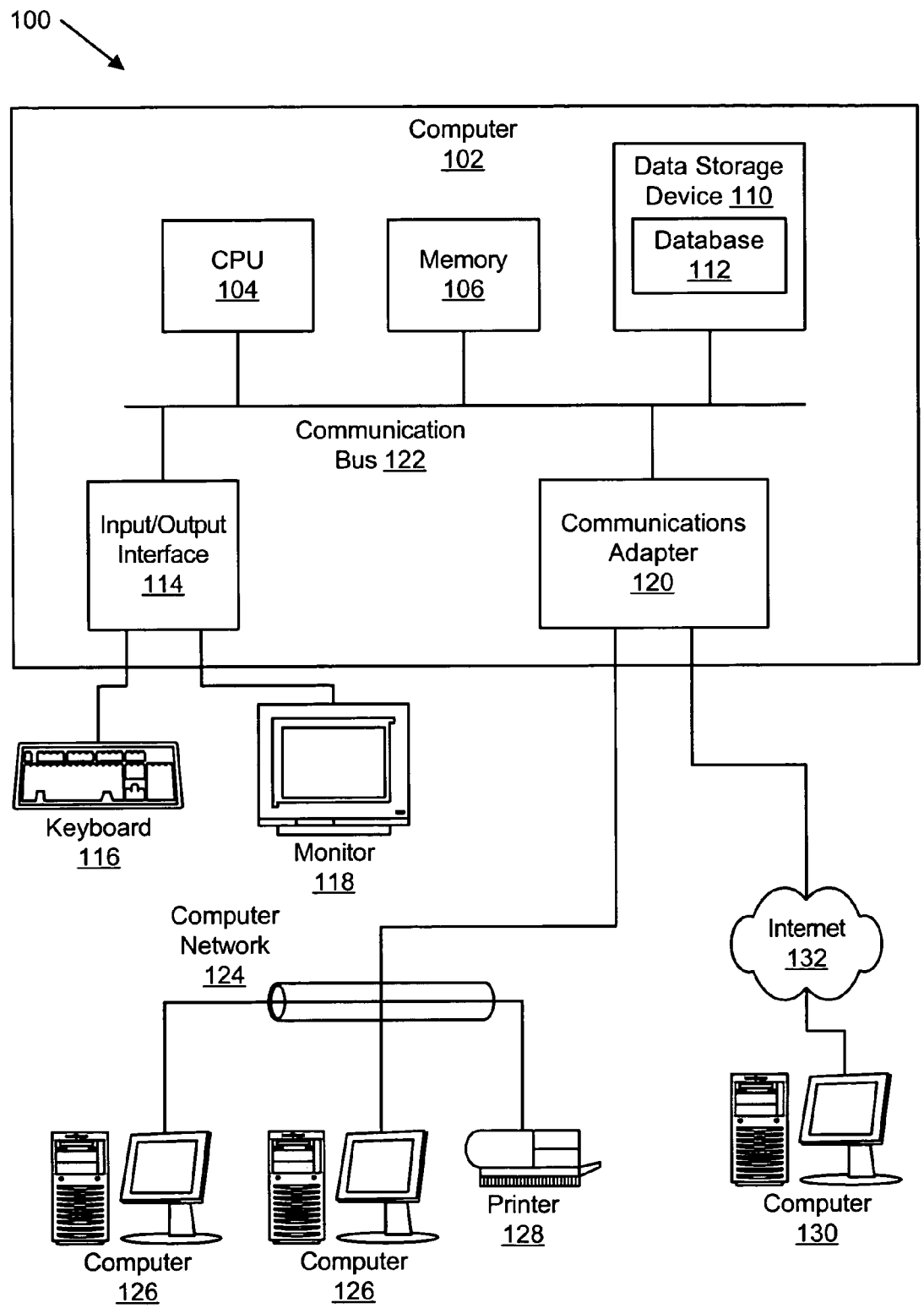
FIG. 1 is a schematic block diagram illustrating one embodiment of a system for efficiently managing membership within a hierarchical data structure in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for efficiently managing membership within a hierarchical data structure in accordance with the present invention. The system 100 includes a computer 102. A computer as referenced herein may be embodied by a personal computer, a laptop computer, a workstation, a mainframe computer, a server, a hand held computer, or any other computing device.

In one embodiment, the computer 102 includes a CPU 104, a memory 106, a data storage device 110, and a database 112 within the data storage device 110 with a hierarchical data structure. The memory 106 may include modules, discussed in more detail below, to carry out the steps of the present invention. The computer 102 also includes an input/output interface 114 for connection to a keyboard 116 or a monitor 118, and a communications adapter 120. The mentioned elements in the computer 102 are all connected to a communication bus 122 configured to facilitate communication between devices.

The communications adapter 120, in one embodiment, is in communication with a computer network 124. The computer network 124 communicates with a plurality of computers 126 and other peripheral devices such as a printer 128. The communication adapter 120 may also be in communication with other computers 130 through the Internet 132. In another embodiment, the communication adapter 120 communicates through a computer 126, such as a server, via the computer network 124 to another computer 130 through the Internet 132.

Figure 2:
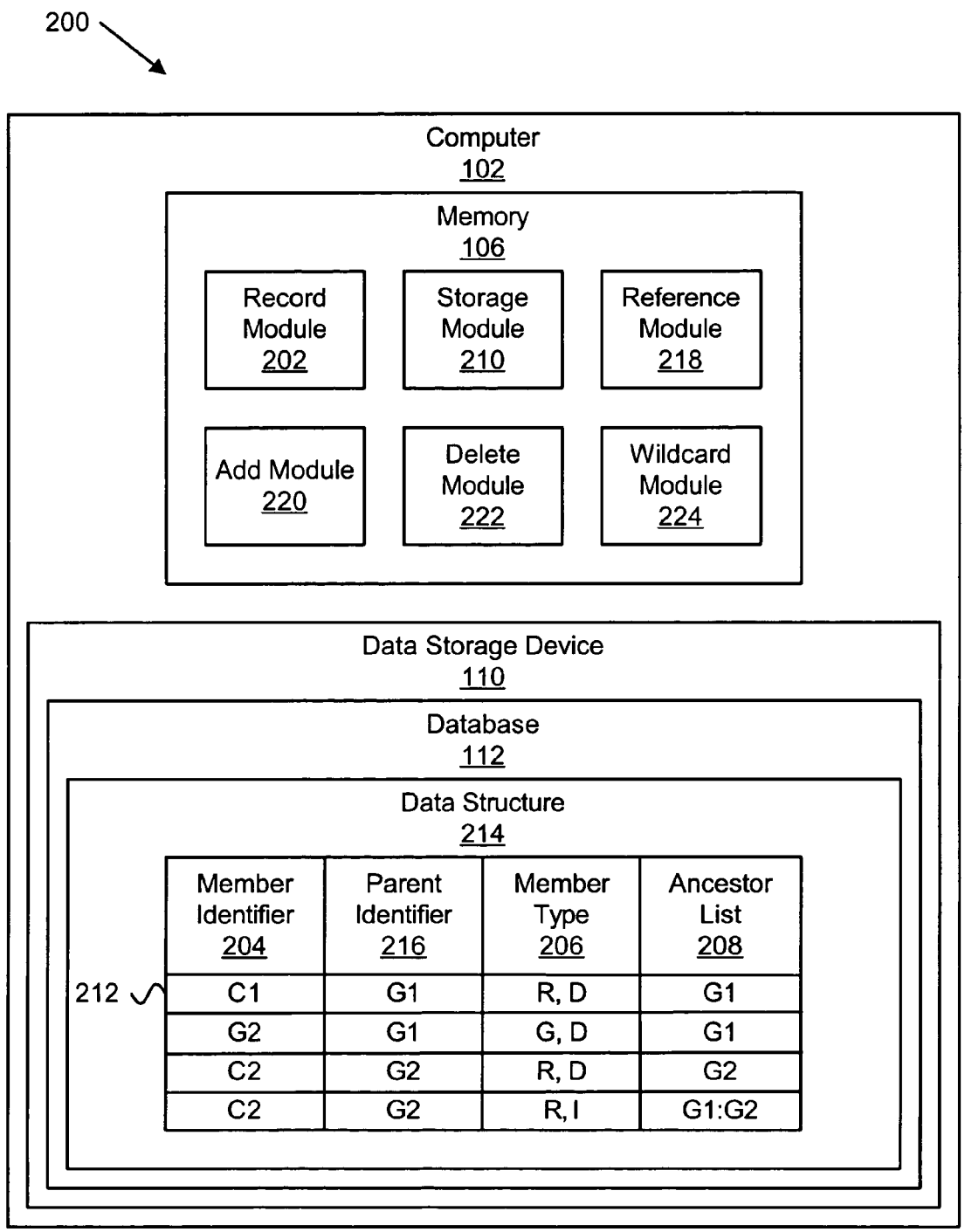
FIG. 2 is a schematic block diagram illustrating one embodiment of an apparatus for efficiently managing membership within a hierarchical data structure in accordance with the present invention.

FIG. 2 is a schematic block diagram illustrating one embodiment of an apparatus 200 for efficiently managing membership within a hierarchical data structure in accordance with the present invention. The apparatus 200 includes a record module 202 in memory 106 configured to create a record including a member identifier 204, a member type 206, and an ancestor list 208 for a member of a hierarchical data structure.

The member identifier 204 is a name or other unique identifier assigned to a member. The name of the member may be alpha-numeric characters, a code, a numeric sequence, or the like. One skilled in the art will recognize other embodiments for a member identifier 204. The member type 206 identifies the member as a resource or a group. The group typically includes at least one resource. A resource may be a file system, a database, a storage partition, a file set, a table, a computer connected to a computer network, or a computer connected to the Internet. One skilled in the art will recognize other resources available to a computer or computer network that may be beneficially grouped.

The ancestor list 208 includes group identifiers. A group identifier is a name of a group. Typically, the group identifier corresponds to the member identifier 204 for a member having a member type 206 of "group." A group may be a set having members which are resources or other groups. Typically, a group will include resources or other groups of a particular type. For example, a computer group may include a list of computers connected to a server. A printer group may include a list of printers accessible to a computer. Since a printer group may be accessible to each computer in the group of computers on a server, a hierarchical structure may be formed. The printers available to the system may, however, not be available to each computer in the system. Consequently, each computer in the computer group may have a different printer group assigned. Therefore the hierarchical structure formed may have a single resource, in this case a printer, assigned to multiple groups. One skilled in the art will recognize other resources and groups that may be identified together as a group.

The group identifiers in an ancestor list 208 are ordered to represent a relationship between the member and the top-level group. In a preferred embodiment, an ancestor list 208 includes group identifiers ordered to represent a hierarchical relationship between a member and a top-level group and separated by colons. For example, a file A may be in group A. Group A may be in group B and group B may be in top-level group C. One embodiment of an ancestor list 208 for file A belonging to group C is represented by C:B:A. The first group in the ancestor list 208 is the top-level group and may be identified as a group identifier. The last group in the ancestor list 208 is the group to which the member directly belongs and is called a parent identifier 216. Intermediate groups represent the relationship between the top-level group and the parent identifier 216.

The ancestor list 208 may be an entry in a table, database, or database table. The hierarchical relationship may be represented by group identifiers separated by spaces or another character. One skilled in the art will recognize other embodiments of an ancestor list 208 of group identifiers ordered to represent a hierarchical relationship between the member and a top-level group.

The apparatus 200 includes a storage module 210 in memory 106 configured to store the record in a collection of records. In a preferred embodiment, a record 212 is a row of a table in a data structure 214 in the database 112. The database 112 may reside in the data storage device 110 on the computer 102. In one embodiment, the member identifier 206 includes whether a member is a resource or group and whether the member is directly or indirectly added to a top-level group. In yet another embodiment, the record 212 includes a parent identifier 216 that identifies a group to which a member directly belongs.

As an example, the first record 212 in a collection of records includes member identifier 204 of resource C1 with parent identifier 216 group G1. The parent identifier 216 is the group that a group or resource directly belongs. For example, if resource X is added to group S which is a member of group T, the parent identifier 216 for resource X is group S to which it directly belongs. Resource X is indirectly related to group T through group S.

The first record 212 also includes a member type 206 identifying the member as a resource with the letter "R," and the letter "D" identifies a direct relationship between the member and the top-level group. The first record 212 also includes an ancestor list 208. Since there are no intermediate groups, the ancestor list 208 includes "G1" as the top-level and parent group for "C1." The record 212 shows that resource C1 is directly added to group G1.

Three more records are shown with the first record 212 and together form a collection. The collection may comprise a non-hierarchical data structure 214 such as a database table. Beneficially, each record is stored in the table or other non-hierarchical data structure 214 and represents a hierarchical relationship between members of a hierarchical data structure such as a tree. Preferably, the hierarchical data structure is a logical construct. The present invention allows this logical construct to be stored in a non-hierarchical manner which allows for direct access. Direct access means that a member of the hierarchical data structure can be located using a single command or database call, such as a Structured Query Language ("SQL") call, rather than a plurality of calls using recursion.

Currently available methods for managing members of a hierarchical data structure require recursion which may be inefficient by traversing through an entire hierarchical data structure to access a member. Instead of recursing through tree data structures, with the present invention, a few direct and simple database calls to the table may retrieve the desired information. The collection of records 212 in a non-hierarchical data structure 214 represents relationships in a hierarchical data structure directly so that recursion is not required. A report generator, for example, can directly reference the non-hierarchical data structure searching for a particular member. A more detailed example of a hierarchical data structure represented by a collection of records in a non-hierarchical data structure 214 is explained in more detail in relation to FIGS. 4-9.

The apparatus 200 includes a reference module 218 in memory 106 that references the record in response to accessing the member of the hierarchical data structure. The hierarchical data structure may be accessed in a variety of ways. In one embodiment, a user selects a member in a hierarchical data structure presented in a graphical user interface. car The reference module 218 may then reference the corresponding record 212 in the non-hierarchical data structure 214. As used herein, referencing a record 212 may comprise retrieving, parsing and displaying, and displaying fields of the record 212 and the like. In another embodiment, an application on the computer 102 accesses a member in a hierarchical data structure represented logically. The reference module 218 may then reference the corresponding record 212 in the non-hierarchical data structure 214. In yet another embodiment, a member of the hierarchical data structure is linked to a corresponding record 212 in the non-hierarchical data structure 214. One skilled in the art will recognize other ways to access a record 212 in a non-hierarchical data structure 214 when a corresponding member of a hierarchical data structure is accessed.

The apparatus 200 may include an add module 220 in memory 106 that directly adds at least one record 212 to the collection or non-hierarchical data structure 214 when a group or resource is added to the hierarchical data structure. For example, if a resource is added to the hierarchical data structure, the add module 220 adds a corresponding record 212 to the non-hierarchical data structure 214. If a group is added to the hierarchical data structure, the add module 220 adds a record 212 for each member of the group to the non-hierarchical data structure 214. Alternatively, a group may be added to the hierarchical data structure without any members even though the group may include members in another location of the hierarchical data structure. For example, group A may include resources X, Y, and X in one location of the hierarchical data structure. If group A is added in another location to the hierarchical data structure without members, the add module 220 adds a single record 220 for the group to the non-hierarchical data structure 214.

Apparatus 200 may also include a delete module 222 in memory 106 that directly deletes a record 212 from the collection or non-hierarchical data structure 214 when a group or resource is deleted from the hierarchical data structure. The delete module 22 may delete records in response to groups and resources being deleted from the hierarchical data structure. The delete module 222 may operate under various conditions such as 1) deleting a resource from a group, 2) removing a group from a group, and 3) removing a group entirely from a hierarchical data structure is explained in more detail in reference to FIGS. 7, 8, and 9.

The apparatus 200 may also include a wildcard module 224 in memory 106 that modifies the collection or non-hierarchical data structure 214 in response to changes in membership in the hierarchical data structure comprising additions and deletions based on a common characteristic among members. For example, the wildcard module 224 may delete all printers from a collection that includes computers, scanners, and printers in response to all printers being deleted from a hierarchical structure.

Figure 3:
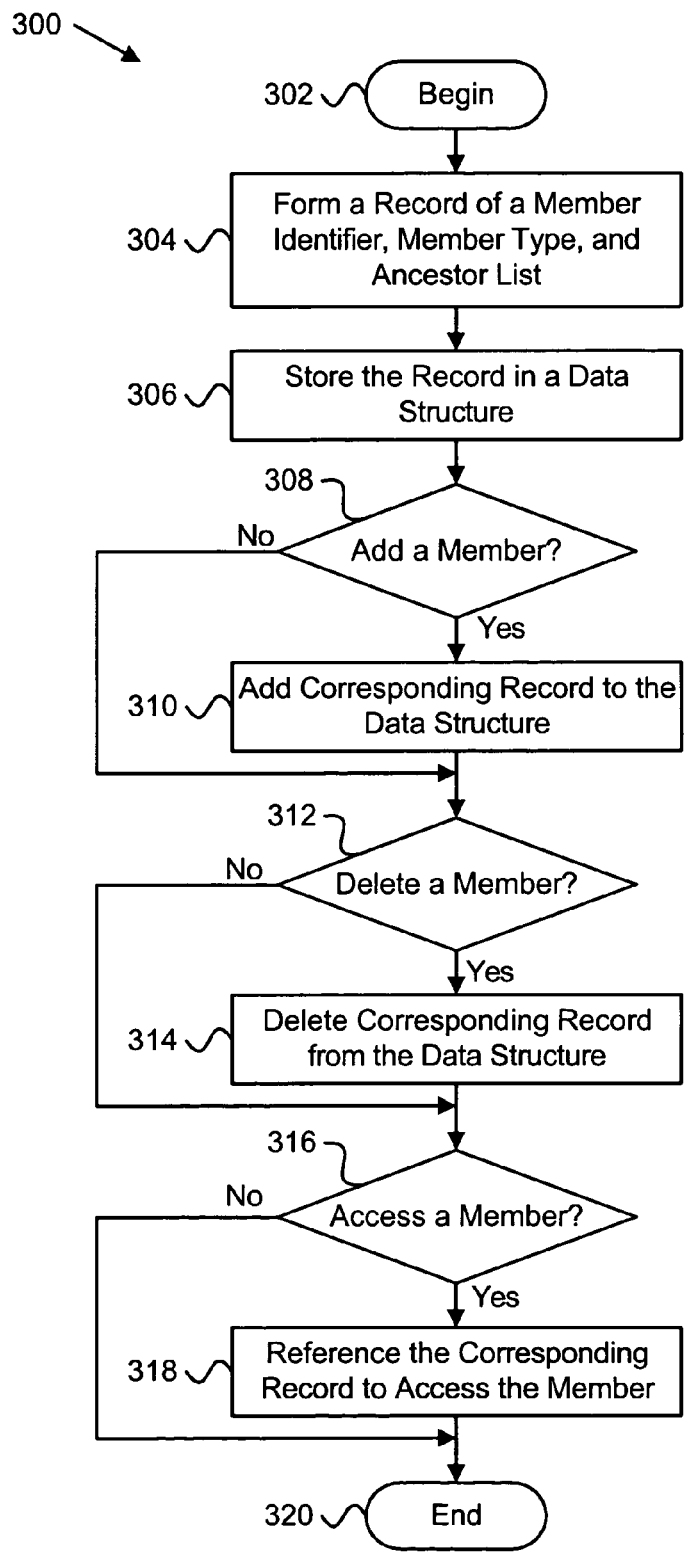
FIG. 3 is a schematic flow chart diagram illustrating one embodiment of a method for efficiently managing membership within a hierarchical data structure in accordance with the present invention.

FIG. 3 is a schematic flow chart diagram illustrating one embodiment of a method 300 for efficiently managing membership within a hierarchical data structure in accordance with the present invention. The method 300 begins 302 when the record module 202 creates 304 a record 212 comprised of a member identifier 204, a member type 206, and an ancestor list 208 for a member of a hierarchical data structure. Initially, the hierarchical data structure may comprise a single root group member. The method 200 creates a record 212 for the root group member. In another embodiment, the method 200 creates a non-hierarchical data structure to represent a more complex hierarchical data structure.

In one embodiment, the record 212 includes a parent identifier 216. In another embodiment, the member type 206 may also include whether the member is directly or indirectly added to the top-level group according to how the member is added to the hierarchical data structure. The storage module 210 may then store 306 the record 212 in the non-hierarchical data structure 214.

The add module 220 may then determine 308 that a member (group or resource) is added to a group in a hierarchical data structure. If the add module 220 determines 308 that a member is added, the add module 220 adds 310 a corresponding record 212 to the non-hierarchical data structure 214. If the add module 220 determines 308 that a member is not added to the hierarchical data structure, the method 200 checks for a delete operation for a member of the hierarchical data structure.

The delete module 222 may then determine 312 that a member is deleted from the hierarchical data structure. If so, the delete module 222 deletes 314 the corresponding record 212 from the non-hierarchical data structure 214. As will be explained in more detail below, which records 212 are deleted depends in part on the location of the member in the hierarchical data structure. If the delete module 222 determines 312 that no member is deleted from the hierarchical data structure, the method 200 checks for an access operation for a member of the hierarchical data structure.

The reference module 218 may then determine 316 that a member of the hierarchical data structure is accessed. If the reference module 218 determines that a member is accessed, the reference module 218 references 318 the corresponding record 212 in the collection or non-hierarchical data structure 214 and the method 300 ends 320. If the reference module 218 determines 316 no member is accessed, the method 300 ends 320.

FIG. 4 is part one 400 of an example of one embodiment of a method for efficiently managing membership within a hierarchical data structure in accordance with the present invention. Part one 400 of the example includes a hierarchical data structure 402 and a corresponding collection or non-hierarchical data structure 214 in the form of a table 404. The hierarchical data structure 402 is formed by including resource C1 in group G1, resource C2 in group G2, resource C3 in group G3, and resource C4 in group G4. Groups G1, G2, G3, and G4 are top-level groups. The table 404 depicts the hierarchical data structure 402 in a non-hierarchical form.

The table 404 includes a record 212 in each row corresponding to each member (or node) of the hierarchical data structure 402. Resource C1 in group G1 in the hierarchical data structure 402 corresponds to row 1 of the table 404. The member identifier 204 of row 1 is C1. A group identifier 406 identifies the top-level group that includes the member. The group identifier 406 of row 1 is G1. The parent identifier 216 of row 1 is G1 since the group to which C1 directly belongs in the hierarchical data structure 402 is G1. The member type 206 of row 1 is an "R" for resource and a "D" for directly added because C1 is a resource and is directly added to group G1 without any intervening groups. The ancestor list 208 of row 1 is G1 because C1 is added directly to G1 so an ancestor list 208 G1 identifies this relationship. Similarly, row 2 of the table 404 represents resource C2 directly added to group G2, row 3 represents resource C3 directly added to group G3, and row 4 represents resource C4 directly added to group G4.

FIG. 5 is part two 500 of an example (introduced in FIG. 4) of one embodiment of a method for efficiently managing membership within a hierarchical data structure in accordance with the present invention. Part two 500 of the example depicts the resulting hierarchical data structure 502 and corresponding table 504 when the add module 220 adds group G4 to group G3, group G3 to group G2, group G2 to group G1, and group G3 to group G1. In this part 500 of the example, when a group is added to the hierarchical data structure, all members of the group are added as well. A row in the table 504 is added for each added member. Alternatively, a group or resource may be added to a hierarchical data structure independently without other member of the group being added. Rows 5 to 20 of the table 504 depict the added records where each record corresponds to an added member (a resource or group) in the hierarchical data structure 502.

For example, row 10 is a record corresponding to resource C4 (as indicated by arrow 506) being added indirectly to group G2. Since the resource name added to row 10 is C4, the member identifier 204 is C4. The top-level group to which C4 is added is G2, so the group identifier 406 is G2. The group that resource C4 is directly added is G4 so the parent identifier 216 is G4. C4 is a resource and is added indirectly to group G2 so the member type 206 is an "R" and an "I." Since resource C4 is in group G2 by way of group G3 and group G4, the ancestor list 208 is G2:G3:G4. The other added rows in the table 504 have similar relationships to members in the hierarchical data structure 502.

Figure 6:
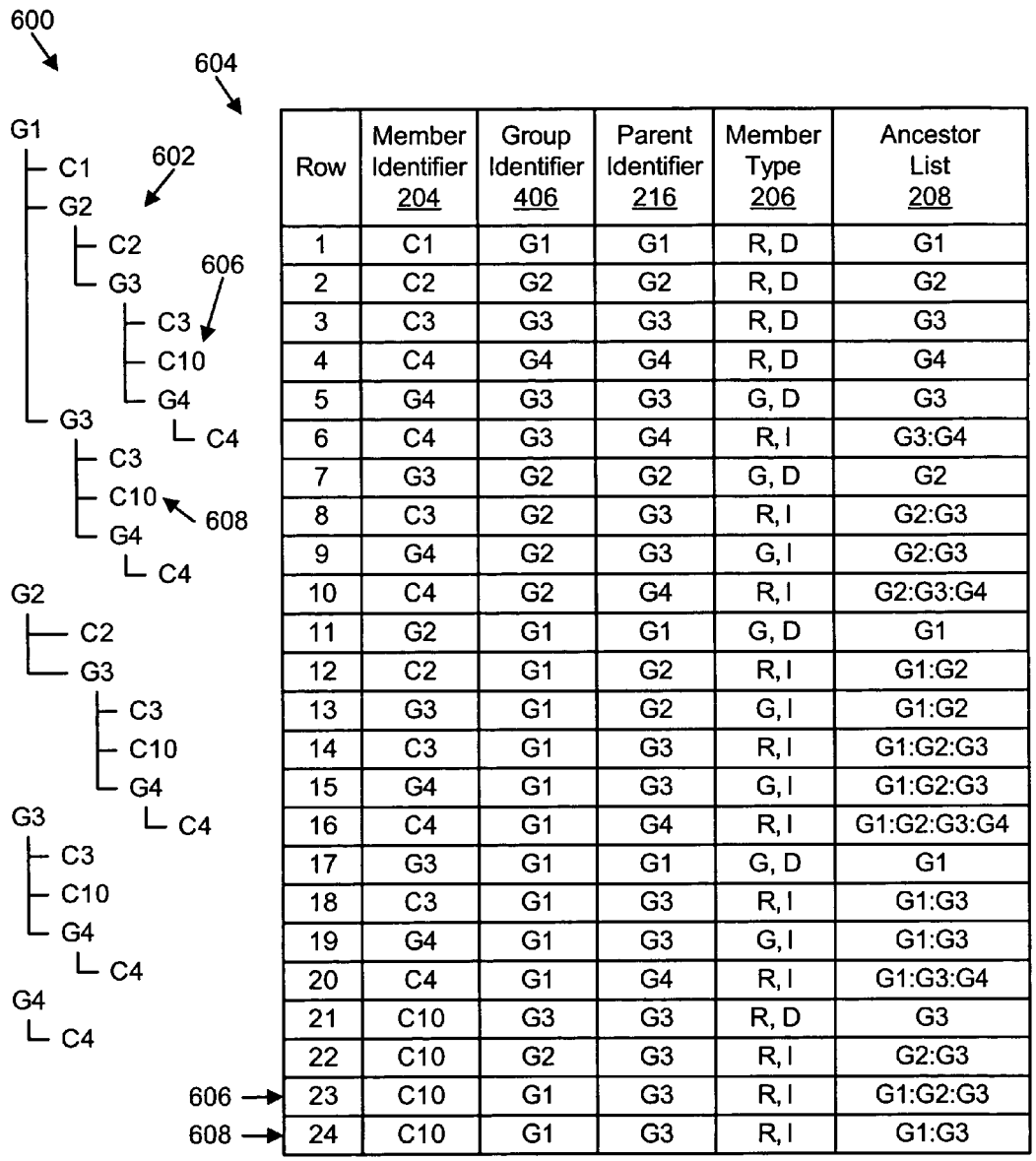
FIG. 6 is part three of an example of one embodiment of a method for efficiently managing membership within a hierarchical data structure in accordance with the present invention.

FIG. 6 is part three 600 of an example of one embodiment of a method for efficiently managing membership within a hierarchical data structure in accordance with the present invention. Part three 600 of the example depicts the resulting hierarchical data structure 602 and corresponding table 604 when the add module 220 adds resource C10 to group G3, wherever G3 occurs in the hierarchical data structure. Alternatively, a resource may be added to a group without adding the resource to other occurrences of the group. As a result of adding resource C10 to group G3, rows 21 to 24 are added to the table 604. Note that resource C10 is added twice (indicated by arrows 606 and 608) to group G1 since group G3 belongs to group G1 via group G2 and as a direct group as well. The ancestor list 208 keeps track of the position and relationship of resources because as indicated, a resource may be included in a group more than once. Row 23 corresponds to one occurrence of resource C10 in the hierarchical data structure 602 and row 24 corresponds to a different occurrence of resource C10.

Figure 7:
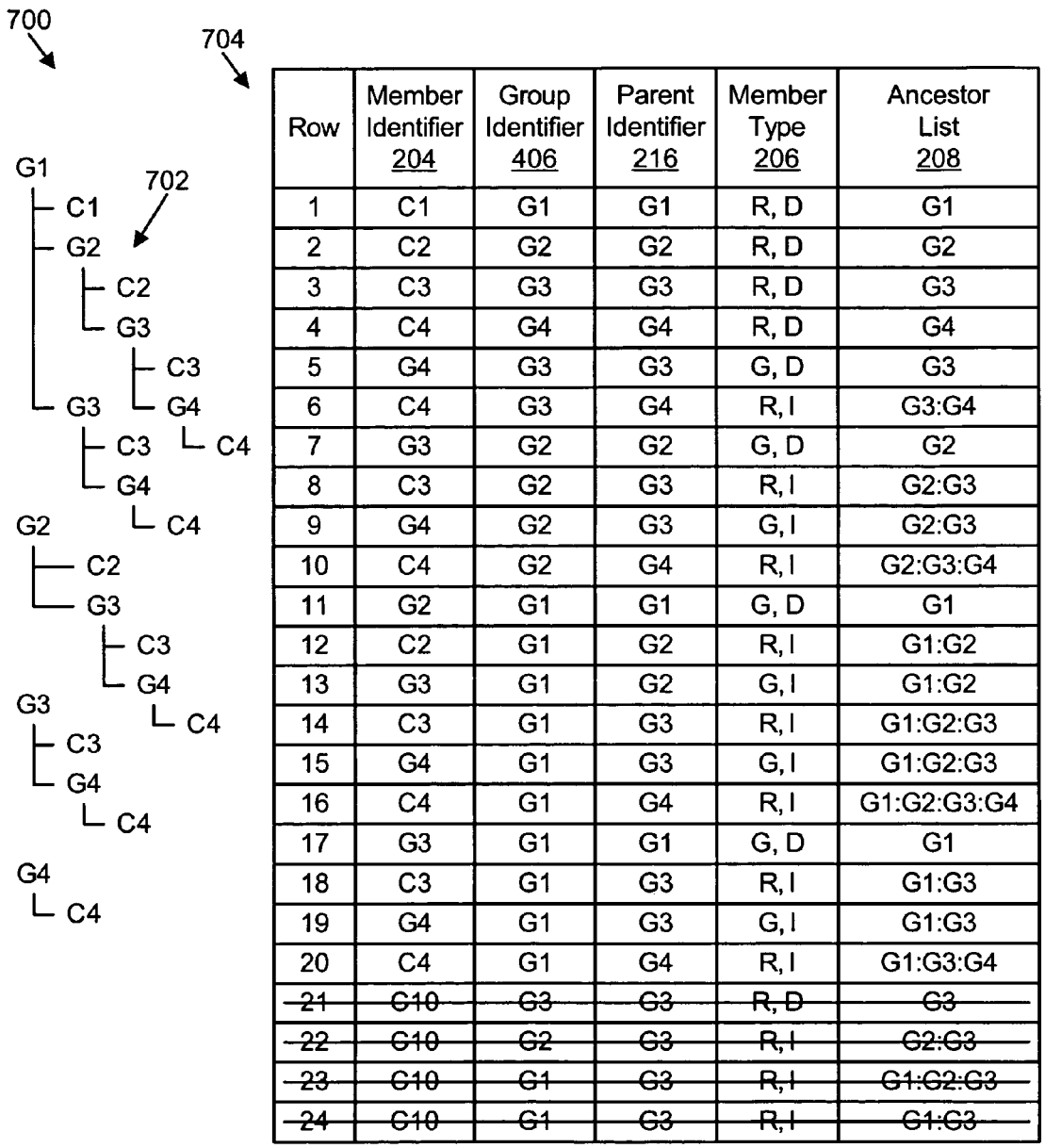
FIG. 7 is part four of an example of one embodiment of a method for efficiently managing membership within a hierarchical data structure in accordance with the present invention.

When the delete module 222 deletes resources or groups, there are at least three possible cases: 1) a resource is removed from a group, 2) a group is removed from a group, and 3) a group definition is deleted. FIG. 7 is part four 700 of an example of one embodiment of a method for efficiently managing membership within a hierarchical data structure in accordance with the present invention. Part four 700 of the example depicts the hierarchical data structure 702 and corresponding table 704 when the delete module 222 deletes a resource from a group. In this part 700 of the example, the delete module 222 deletes every occurrence of resource C10 from group G3. As a result, the delete module 222 deletes rows 21 to 24 from the table 704.

Figure 8:
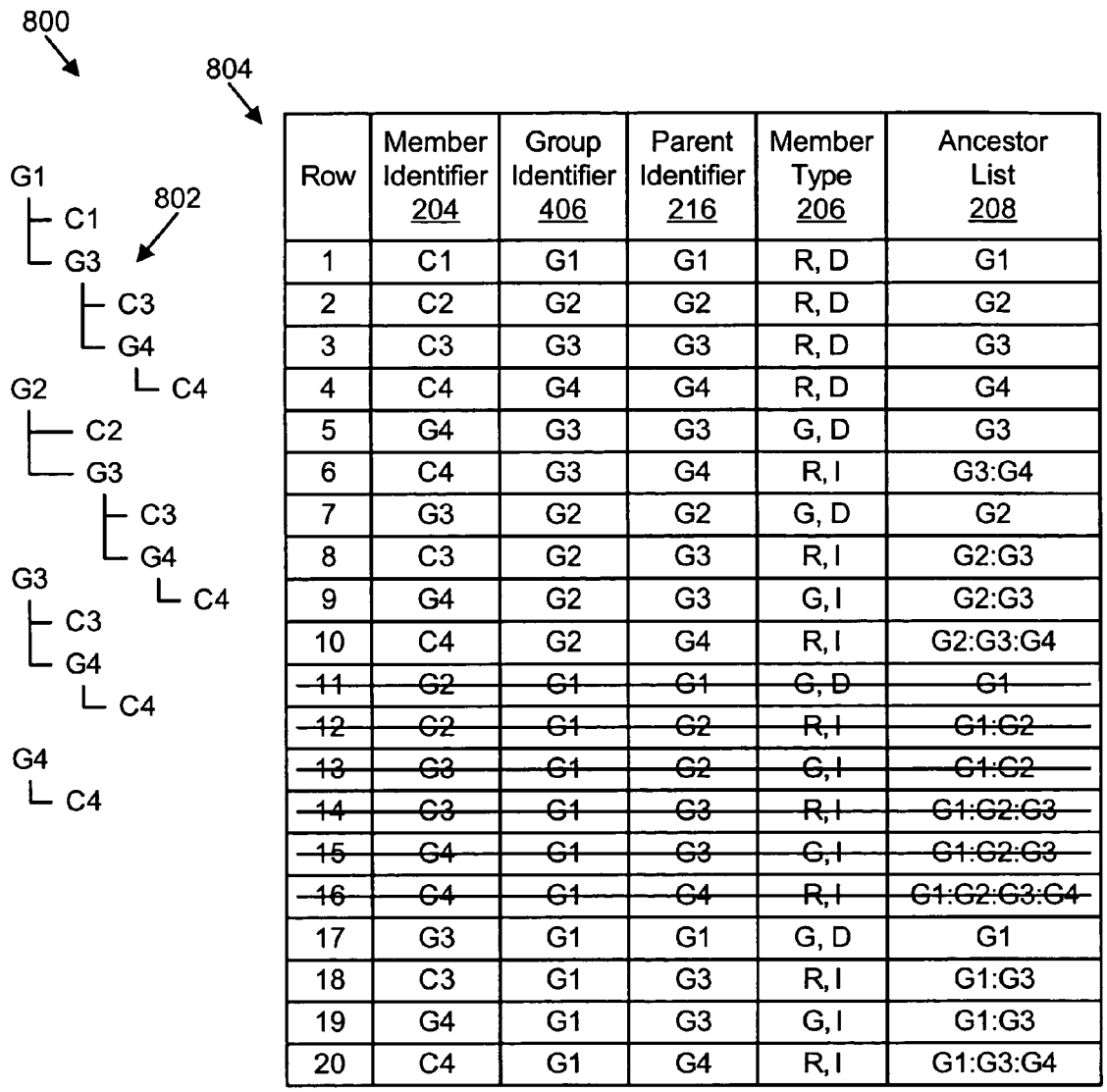
FIG. 8 is part five of an example of one embodiment of a method for efficiently managing membership within a hierarchical data structure in accordance with the present invention.

FIG. 8 is part five 800 of an example of one embodiment of a method for efficiently managing membership within a hierarchical data structure in accordance with the present invention. Part five 800 of the example depicts the hierarchical data structure 802 and corresponding table 804 when a group is removed from a group. When a group is deleted, the members of the group are also deleted. In part five 800 of the example, the delete module 222 deletes group G2 from top-level group G1. As a result, the delete module 222 deletes rows 11 to 16 from the table 804.

FIG. 9 is part six 900 of an example of one embodiment of a method for efficiently managing membership within a hierarchical data structure in accordance with the present invention. Part six 900 of the example depicts the hierarchical data structure 902 and corresponding table 904 when the delete module 222 deletes a group definition completely. In the depicted part six 900 of the example, the delete module 222 deletes group G3. As a result, the delete module 222 deletes rows 3 and 5 to 14 from the table 904.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making a computer implemented process to enable efficiently managing membership within a hierarchical data structure, the method comprising:

encoding a first set of computer instructions onto a computer readable medium, said first instructions configured to create a record in a relational table for a member of a hierarchical data structure, wherein the record is a non-hierarchical data structure that represents a hierarchical relationship between a member of the hierarchical data structure and a top-level group member, the record comprising a member identifier, a member type, and an ancestor list wherein the member type identifies the member as a resource or a group comprising at least one resource, wherein a resource comprises one of a logical and a hardware entity available to a computer on a network; and the ancestor list comprises group identifiers representing logical groupings of resources and groups, the group identifiers ordered to represent a hierarchical relationship between the member and the top-level group member wherein at least one record comprises an ancestor list of a member indirectly related to the member's corresponding top-level group and the ancestor list of the member includes groups in an order representing a hierarchical relationship between the member and the top-level group member, the ancestor list including the group identifier to which the member directly belongs, the top-level group identifier to which the member belongs, and intermediate group identifiers;

encoding a second set of computer instructions onto a computer readable medium, said second instructions configured to store the record in a collection on a computer readable medium, wherein the collection comprises a non-hierarchical data structure configured to represent the hierarchical relationship between members of the hierarchical data structure having a common top-level group member;

encoding a third set of computer instructions onto a computer readable medium, said third instructions configured to reference the record in the relational table instead of traversing the hierarchical data structure in response to accessing the member of the hierarchical data structure;

encoding a fourth set of computer instructions on a computer readable medium, said forth instructions configured to modify the collection in response to changes in membership in the hierarchical data structure.

2. The method of claim 1, further comprising encoding a fourth set of computer instructions onto a computer readable medium, said fourth instructions configured to modify the collection in response to changes in membership in the hierarchical data structure.

3. The method of claim 1, further comprising encoding a fifth set of computer instructions onto a computer readable medium, said fifth instructions configured to directly access the record in the collection.

4. The method of claim 1, further comprising encoding a sixth set of computer instructions onto a computer readable medium, said sixth instructions configured to directly add at least one record to the collection when a member is added to the hierarchical data structure.

5. The method of claim 1, further comprising encoding a sixth set of computer instructions onto a computer readable medium, said sixth instructions configured to directly delete at least one record from the collection when a member is deleted from the hierarchical data structure.

6. The method of claim 2, wherein changes in membership in the hierarchical data structure comprise additions and deletions based on a common characteristic among members.

7. The method of claim 1, wherein the member type further comprises direct/indirect identifier that indicates that a member relates directly or indirectly to a top-level group, wherein the direct/indirect identifier of a member that directly relates to the top-level group indicates a direct relationship and the direct/indirect identifier of a member that indirectly relates to the top-level group indicates an indirect relationship.

8. The method of claim 1, wherein the record further comprises a parent identifier that identifies a group to which a member directly belongs.

* * * * *